United States Patent
Baker et al.

(10) Patent No.: US 8,757,890 B2
(45) Date of Patent: Jun. 24, 2014

(54) METHOD AND APPARATUS FOR SETTING ROLLING ELEMENT BEARINGS IN ROLLING MILLS

(75) Inventors: Mark E. Baker, Massillon, OH (US); Nigel A. Los, Alliance, OH (US); Thomas L. Baker, North Canton, OH (US)

(73) Assignee: The Timken Company, North Canton, OH (US)

( * ) Notice: Subject to any disclaimer, the term of this patent is extended or adjusted under 35 U.S.C. 154(b) by 67 days.

(21) Appl. No.: 13/387,252

(22) PCT Filed: Jul. 29, 2010

(86) PCT No.: PCT/US2010/043676
§ 371 (c)(1),
(2), (4) Date: Jan. 26, 2012

(87) PCT Pub. No.: WO2011/014629
PCT Pub. Date: Feb. 3, 2011

(65) Prior Publication Data
US 2012/0128279 A1 May 24, 2012

Related U.S. Application Data

(60) Provisional application No. 61/229,829, filed on Jul. 30, 2009, provisional application No. 61/296,613, filed on Jan. 20, 2010.

(51) Int. Cl.
*F16C 35/06* (2006.01)
*F16C 19/22* (2006.01)
*F16C 23/08* (2006.01)
*B65G 39/10* (2006.01)

(52) U.S. Cl.
USPC ........... 384/587; 384/514; 384/519; 384/583; 384/548; 492/27; 29/898.09

(58) Field of Classification Search
USPC ......... 384/514, 548, 556, 558, 571, 564, 569, 384/585, 587, 519, 583; 29/428, 898.09; 492/1, 27
See application file for complete search history.

(56) References Cited

U.S. PATENT DOCUMENTS 2,871,737 A * 2/1959 Malachowski .................... 492/1
2,939,750 A * 6/1960 Weckstein .................... 384/585

(Continued)

FOREIGN PATENT DOCUMENTS

EP 0425072 A1 5/1991

(Continued)

OTHER PUBLICATIONS

Notification of Transmittal of the International Search Report and the Written Opinion of the International Searching Authority, or the Declaration; International Application No. PCT/US2010/043676 filed Jul. 29, 2010.

*Primary Examiner* — Marcus Charles
(74) *Attorney, Agent, or Firm* — Michael Best & Friedrich LLP

(57) ABSTRACT

A method for assembling a set of bearing assemblies 100 onto a mill roll 10 and for establishing a required bearing setting. The mill roll 10 is configured to receive a set of bearing assemblies 100 at each axial end, with the bearing rolling elements 100A contained within supporting chocks 102 adapted for placement within a mill housing. The chock assembly 102R and bearing assembly 100 at a first end of the roll are positioned first, and coupled to the first end an axial center rod 22 passing through an axial bore 24 of the roll 12. The chock assembly 102L and bearing assembly 100 at the second end of the roll 12 is then positioned onto the opposite end of the roll 12, and a connecting sub-assembly 300, 400, 504A is secured to the second end of the axial center rod 22. The connecting sub-assembly engages the second chock assembly 102L and bearing assembly 100, and is adjusted to achieve a desired bearing setting for both bearing assemblies 100 through the center rod 22.

26 Claims, 11 Drawing Sheets

(56) References Cited

U.S. PATENT DOCUMENTS

| | | | |
|---|---|---|---|
| 3,528,273 A * | 9/1970 | Elton et al. | 72/237 |
| 3,740,982 A * | 6/1973 | Hacker et al. | 72/12.2 |
| 4,567,744 A * | 2/1986 | Yoshiwara et al. | 72/68 |
| 4,938,615 A * | 7/1990 | Baker | 384/571 |
| 2006/0065770 A1* | 3/2006 | Hausman et al. | 241/285.1 |
| 2007/0039187 A1* | 2/2007 | Guempel et al. | 29/898.09 |
| 2008/0269032 A1* | 10/2008 | Cooper et al. | 492/1 |

FOREIGN PATENT DOCUMENTS

| | | | |
|---|---|---|---|
| GB | 1278487 | 6/1972 | |
| GB | 1413270 A * | 11/1975 | B21H 1/18 |
| JP | 07256302 A * | 10/1995 | B21B 1/22 |
| WO | 2005061140 A1 | 7/2005 | |

\* cited by examiner

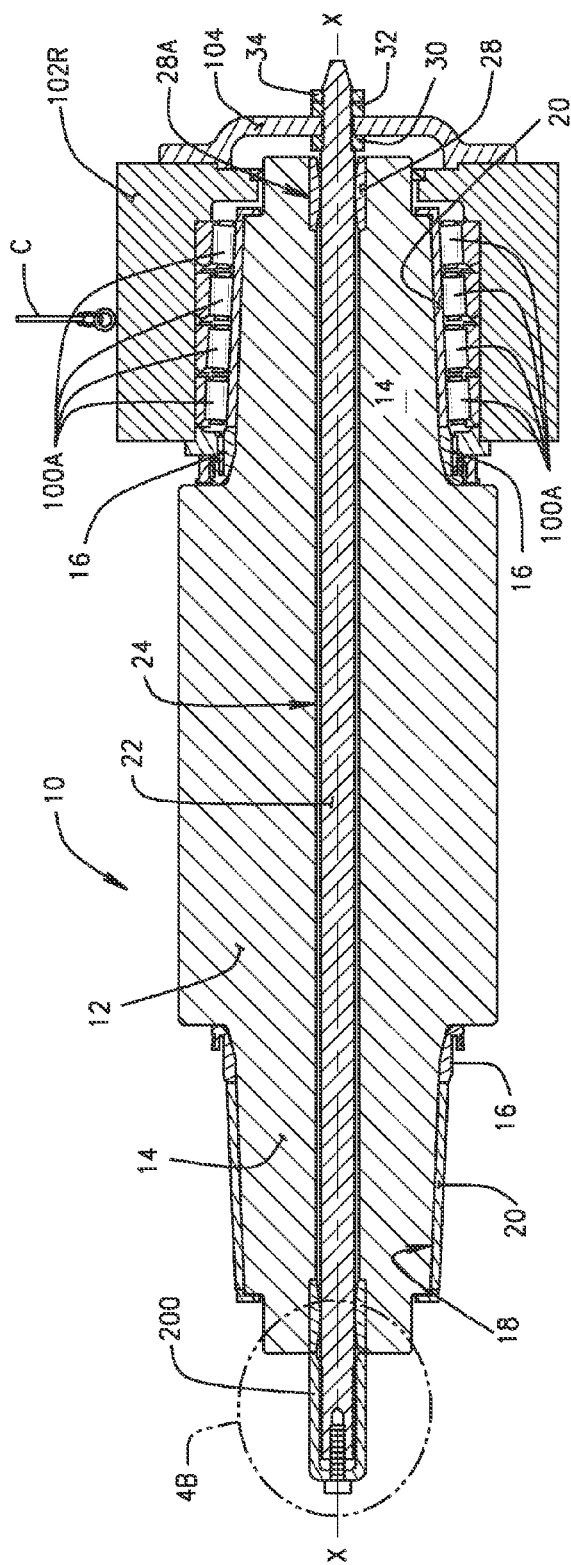
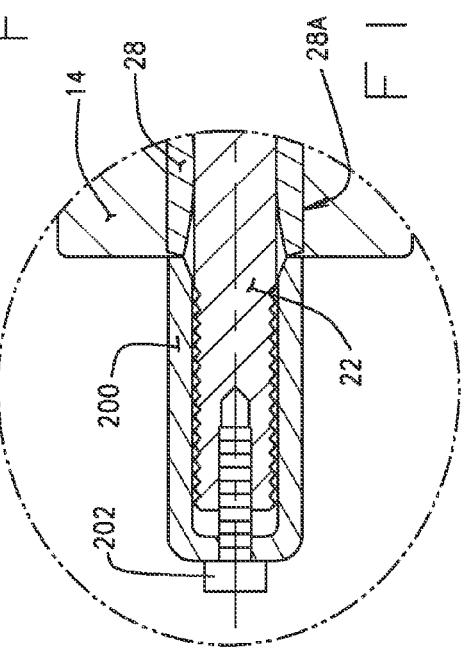
FIG. 4A
FIG. 4B

METHOD AND APPARATUS FOR SETTING ROLLING ELEMENT BEARINGS IN ROLLING MILLS

CROSS-REFERENCE TO RELATED APPLICATIONS

The present application is the United States National Stage under 35 U.S.C. §371 of International Application Serial No. PCT/US2010/043676, having an international Filing Date of Jul. 29, 2010. International Application Serial No. PCT/US2010/043676 is related to, and claims priority from, U.S. Provisional Patent Application Ser. No. 61/229,829 filed on Jul. 30, 2009, which is herein incorporated by reference.

International Application Serial No. PCT/US2010/043676 is further related to, and claims priority from, U.S. Provisional Patent Application Ser. No. 61/296,613 filed on Jan. 20, 2010, which is herein incorporated by reference.

STATEMENT REGARDING FEDERALLY SPONSORED RESEARCH

Not Applicable.

BACKGROUND OF THE INVENTION

The present disclosure is related generally to bearings for supporting rollers in rolling mill applications, and in particular to a system and method for mounting roller support bearings.

Two types of bearings find widespread use in such rolling mill machinery, those being the tapered roller bearing and the cylindrical roller bearing, each of which is capable of carrying heavy radial loads. Tapered roller bearings lend themselves to adjustment in that the axial positions of the supporting races relative to each other control the radial clearance or play, and may even eliminate the radial clearance altogether. This in turn provides control of the size of the load zone, that is the number of rollers in the bearing which are actually under load at any instant. Notwithstanding this capability, tapered roller bearings, when used to transmit extremely heavy loads such as in rolling mills, are usually manufactured with their tapered rollers arranged in four rows, and with the tapers of adjacent rows oriented oppositely. This makes adjustments in the field difficult, and for all practical purposes these multi-row bearings are adjusted at the factory through the selection of spacers. There the bearings are usually set with a slight amount of axial clearance. However, the profile of the raceway on the cone or inner race is not perfectly circular nor is its axis perfectly coincident with the axis of rotation. These imperfections cause runout.

Cylindrical roller bearings, on the other hand, cannot be adjusted, and since some radial clearance must exist between the rollers and the raceways in order to assemble the bearings, cylindrical roller bearings inherently will have runout, given that the inner race cannot be ground to a perfectly round condition. Despite the inherent runout, the use of cylindrical roller bearings in mill rolls affords easier control over the runout derived from the manufacturing tolerances. For example, the raceway of the inner race, once that race is installed on the roll neck, may be ground reasonably true with respect to the axis of the roll. Typically, the mill roll, with the inner races of its bearings in place, is placed between centers with the roll neck later supported on steady rests. The grinding eliminates much of the runout caused by manufacturing tolerances in the roll neck and race, and the expansion tolerance of the press fit. However, some runout will remain due primarily to imperfections in the grinding operation itself, for the inner race may have one or more lobes in its profile after grinding.

The option of grinding to eliminate runout has not been available for tapered roller bearings, primarily because their races are at different inclinations, and the inner races or cones have ribs, all of which interfere with the grinding operations. Furthermore, alteration of a radial dimension on a tapered raceway affects the axial dimensions in the bearing, and requires the use of additional spacers or shims to compensate for the change in the axial dimension.

If the bearings supporting a roll in a rolling mill are improperly set, various problems can ensue. For bearings which have too much endplay, there is an increased chance of roller skidding (i.e. low load zone) and lower bearing life (as the load zone decreases, the load per roller ratio increases, and bearing life decreases.) Conversely, for bearings set with too much preload, there is the risk of bearing burn-up, which is generally a catastrophic damage and cannot be easily repaired.

Accordingly, it would be advantageous to provide a method and apparatus to facilitate the proper mounting and setting of roller bearings such as those used to support back up rolls in rolling mill applications. It would be further advantageous to provide such a method and apparatus to achieve good control over the bearing settings from a cold state through steady-state operating conditions.

BRIEF SUMMARY OF THE INVENTION

Briefly stated, the present disclosure provides a method for assembling a set of bearings onto a mill roll and for establishing a required bearing setting. The mill roll is configured to receive a set of bearings at each axial end, with the bearings contained within supporting chocks adapted for placement within a mill housing. The chock and bearing at a first end of the roll is positioned first, and coupled to the first end by a center rod passing through an axial bore of the roll. The chock and bearing at the second end of the roll is then positioned onto the opposite end of the roll, and a connecting sub-assembly is secured to the second end of the center rod. The connecting sub-assembly engages the second chock and bearing, and is axially adjusted to achieve a desired bearing setting.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 4A illustrates a sectional view of the roll with the non-adjustable chock secured to the roll end by a temporary restraint at the opposite end of the center rod;

FIG. 4B is an enlarged view of the temporary restraint in FIG. 4A;

Corresponding reference numerals indicate corresponding parts throughout the several figures of the drawings. It is to be understood that the drawings are for illustrating the concepts set forth in the present disclosure and are not to scale.

DETAILED DESCRIPTION

Figure 1A:
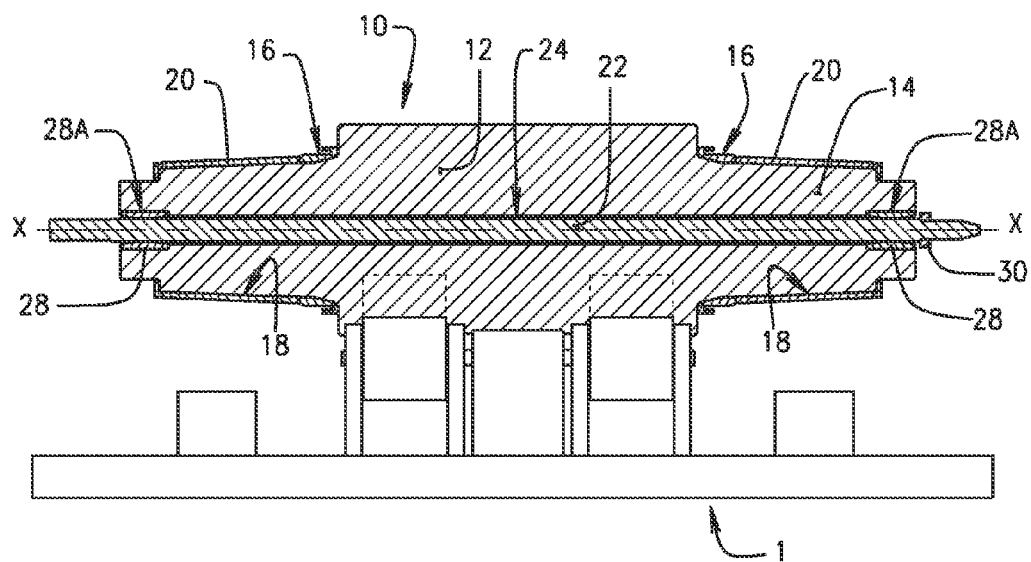
FIGS. 1A and 1B illustrate a roll supported on a set-up stand for assembly of the roll support bearings and chocks, with optional bushings inserted into the roll ends.

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

A mill stand has multiple rolls 10, each of which at its axial ends rotates in a bearing assembly 100 which in turn is confined within a chock 102 that fits into a heavy end frame mounted securely on a supporting foundation. It will be understood by those skilled in the art that unless otherwise indicated, bearing assembly 100 includes a bearing assembly 100R and 100L, and chock 102, a chock 102R and 102L. Actually, each roll 10 is one of at least two rolls and possibly four, as the typical four-high mill stand has two work rolls between which a piece of metal to be worked passes, and in addition a pair of back-up rolls which are larger than the work rolls, and which serve to prevent the work rolls from deflecting under the separating force needed to reduce the metal piece's (or sheet's) thickness. As in any mill stand, the chocks 102 slide vertically relative to the end frames in which they are located, but are normally held together by large turn down screws which thread into the frame and bear against the chocks 102 for the upper back-up roll. Hydraulic pressure pistons controlled through a feedback loop may be used to vertically position the chocks 102 in lieu of the turn down screws, and are actually more commonly used in today's mill designs.

The bearing assembly 100 of the present disclosure may be used to support either a work roll or back-up roll or both, although the latter is perhaps the primary application. The bearing assembly 100 classifies as a tapered roller bearing, and as such, is capable of taking thrust loads as well as the heavy radial loads imparted by the piece of metal which is worked by a supported roll 10. Being one of a pair of tapered roller bearings 102, the bearing assembly 100 may also be adjusted between conditions of endplay and preload.

The roll 10 turns about a longitudinal axis in the bearing assemblies 100, about an axis X of rotation which ideally is coincident to its own center axis. The roll 10 includes a roll body 12, which may be cylindrical, and a roll neck 14 at each end of the body. Each roll neck 14 has a fillet ring 16 where it merges into the body, and beyond the fillet ring 16 a tapered surface 18 on which the bearing 100 is seated. This tapered surface 18 may be directly formed into the roll neck, or preferably, comprising of a tapered sleeve 20 mounted to the roll neck 14, and abutting the fillet ring 16.

Bearing assemblies for roll mills can be are often mounted on the roll in a Direct Mount Arrangement, and a typical bearing assembly will include four rows of rollers. An exemplary conventional roll mill bearing assembly may be seen in U.S. Pat. No. 4,938,615 to Baker, which is herein incorporated by reference. A unique feature of the direct mount arrangement is the inclusion of a center rod 22 that extends through the axial bore 24 of the back-up roll. This center rod (being stationary) is used to connect the right chock 102R to the left chock 102L. Additionally, this center rod 22 is used for conveniently establishing the clearance in the bearing system (two four-row assemblies) by first establishing the "reference preload setting", and then by backing off on a chock adjustment nut threaded to one end of the center rod 22 a predetermined distance to establish the bearing clearance prior to entry or placement of the roll 10 into a mill stand.

Initially when formed, the roll 10 (including both the roll body 12 and roll necks 14 on each end) is very conventional in nature. The roll 10 is first turned on a lathe to achieve the desired roundness and dimensions, using a centering plug in each opening of the axial bore 24 to provide centering for the roll 10 before turning on a lathe. These plugs are needed as well during a surface grinding process at a roll grinder to first support the roll 10 for finish grinding the roll neck extensions 14 prior to supporting the roll 10 on steady rests. The centering plugs must be removed after finish grinding to expose the axial bore 24 that extends the axial length of the roll 10.

Once the roll 10 has been finish ground, then the fillet rings 16 and tapered sleeves 20 of each bearing assembly 100 are disposed on the roll neck 14 with a press fit. The tapered sleeves 20 are supplied with added grindstock, so that they can be finish ground after mounting onto the roll neck 14. This practice is typical of what is done today with the inner rings of cylindrical bearings. Once the tapered sleeves 20 have been mounted, the clamp ring 26 is installed at the outer end of each tapered sleeve 20 to retain the axial position of the tapered sleeves 20. Once mounting is accomplished, the roll 10 is set back onto the steady rests of the roll grinder, for finish grinding the tapered sleeves 20 to the proper size and taper.

Preferably, the roll 10 of the present disclosure is a back-up non-driven roll. Often, forged rolls for back-up rolls (40.0 inch roll body or larger) include an axial bore 24 through the center to optimize the forging process (and prevent eventual cracks from occurring). The remainder are formed by a casting process (and without this "automatic" hole in the center"). Cast rolls may be found in plate mills and some hot mills, but any reputable flat products mill would use a forged roll 10 for all cold mills and most hot mills.

The embodiments of the present disclosure back-up roll system design are intended as a potential replacement for all mills rolling flat products, including plate mills, hot mills, cold mills, temper mills, and foil mills. In basic terms, the bearing assembly 100 is designed for these applications where thrust loads are low (0.5% to 2% of separating force). The mounting system presented herein is intended provide for a simple mounting procedure, with less potential for bearing damage during the mounting process, and control of the bearing's clearance throughout the life of the bearing assembly 100.

Figure 1B:
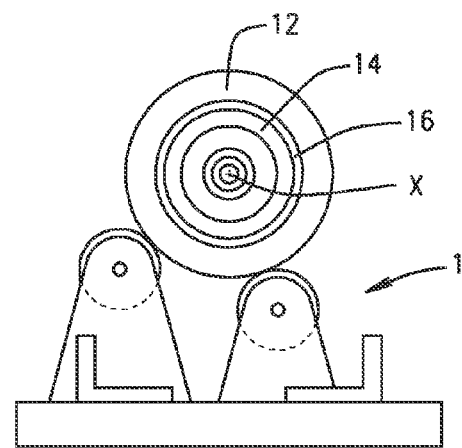

Turning to FIGS. 1A and 1B, one new piece of "Capital Equipment" that will be required for the back-up roll system of the present disclosure is a "Set-Up Stand" 1. The primary function of this set-up stand 1 is to allow for rotation of the roll 10 during the bearing assembly set-up process, where the bearings' system clearance is established. It is suggested that the roll 10 always be rotating whenever the chock adjusting nut is being rotated to affect bearing setting—either by loosening or tightening the setting. However, the first several steps of assembling both chocks 102 onto the roll 10 will be done with the roll 10 held stationary.

Step 1 of the Process is shown in FIGS. 1A and 1B. Any centering plugs present from the roll forming process are removed, and replace with optional bushings 28 in each end of the roll 10. Note that the roll 10 may require a counterbore 28A in the axial ends of the roll 10 to accept both the centering plug and bushing 28 (both press-fit into the roll 10). These bushings 28 include shallow angle chamfers for piloting the center rod 22 axially through the axial bore 24 of the roll 10. Once the bushings 28 have been press fit into place, the center rod 22 will be passed through the roll 10 from the axial end where a non-adjustable chock 102R will be fitted, to the opposite axial end of the roll 10 where chock lateral adjustment can be made to the adjustable chock 102L. Those of ordinary skill in the art will recognize that the designation of one chock 102 as adjustable merely denotes the side at which the chock lateral adjustment will take place, and is not intended to limit the present invention to adjustment at only the left side of the roll 10. An axial end of the center rod 22 with a shoulder nut 30 secured to it will establish the end for placement of the non-adjustable chock 102R on the roll neck 14.

Figure 2:
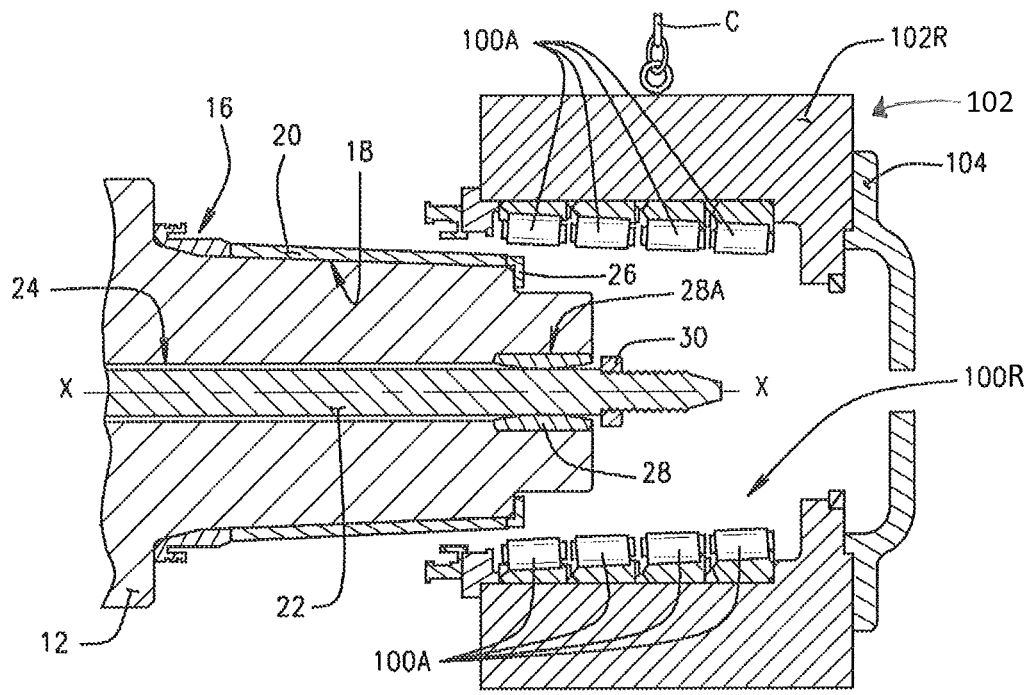
FIG. 2 illustrates the initial step in the installation process for placing the non-adjustable chock onto a roll end.
Figure 3:
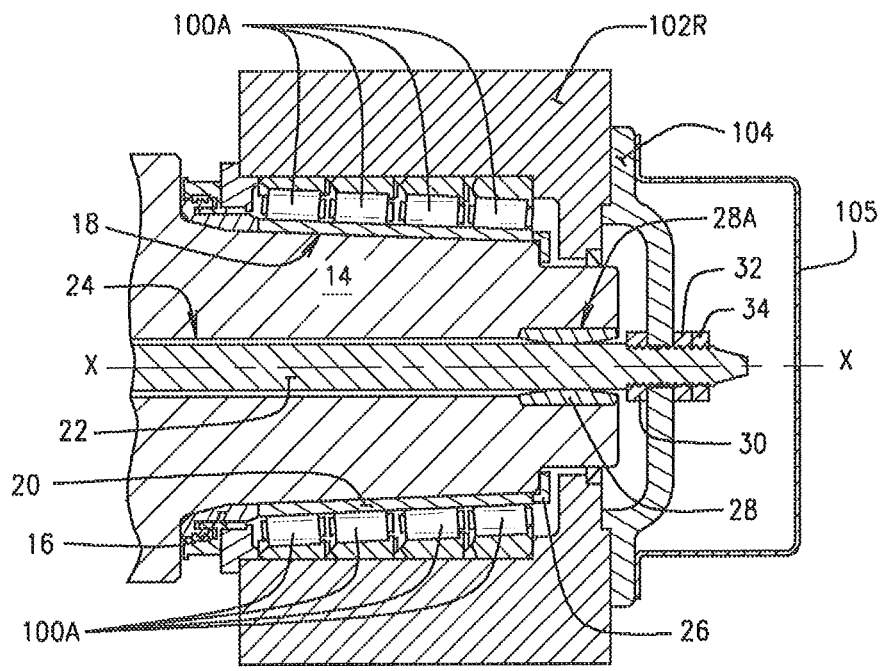
FIG. 3 illustrates the completed installation process for placing the non-adjustable chock onto a roll end.

Turning to FIGS. 2 and 3, the cup-spacer-roller assemblies of each bearing 100 are preassembled into the chock 102R, and clamped tightly in place. An end cover 104 is secured tightly to the outer face of the non-adjustable chock 102R. The end cover 104 is robust in design to absorb the net external thrust that will be absorbed through the center rod 22 when fully assembled. Generally, an overhead crane C is all that is needed for assembling the chock-roller assembly over the inner rings or tapered sleeve 20 on the roll neck 14, however, other lifting machines may be utilized for assembling the chocks 102 if available. Here, the radial clearance is exceptionally high when the rollers 100A first pass over the roll neck or tapered sleeve 20. Preferably, this radial clearance is equal to the width of the bearing 100 divided by 12. For example, a 36" wide bearing 100 will have a 3" diametral clearance (1½" radial clearance) when passing over the small end of the tapered sleeves 20 that has a 1/12 taper on the diameter.

The chock 102 R will stop moving axially inward after the rollers 100A have made final contact with the inner rings on the tapered sleeve 20, as shown in FIG. 3. At this point, the non-adjustable chock 102R remains secured with the overhead crane C or other lifting mechanism. The end cover 104 is next secured between the shoulder nut 30 and a setting nut 32. A jam nut 34 is additionally applied to the end of the center rod 22 to assure that the end cover 104 remains firmly secure on the center rod 22 and that the center rod is not free to rotate relative to the end cover 104. An optional dust cover 105 may be disposed over the exposed end. Note, however at this stage, the chock 102R is not completely secure from sliding down the taper of the inner rings or tapered sleeve 20. The chock 102R is only connected to the center rod 22 that is "loose" within the center bore 24 of the roll 10. To prevent the center rod 22 from pulling through the roll 10, a temporary holding device 200, shown in FIGS. 4A and 4B may be secured by an axial bolt 202 on the opposite axial end of the center rod 22 to keep the chock 102R from falling off the end of the roll 10, when transitioning over to assembly the "adjustable chock" on the opposite axial end. (FIG. 5).

Figure 5:
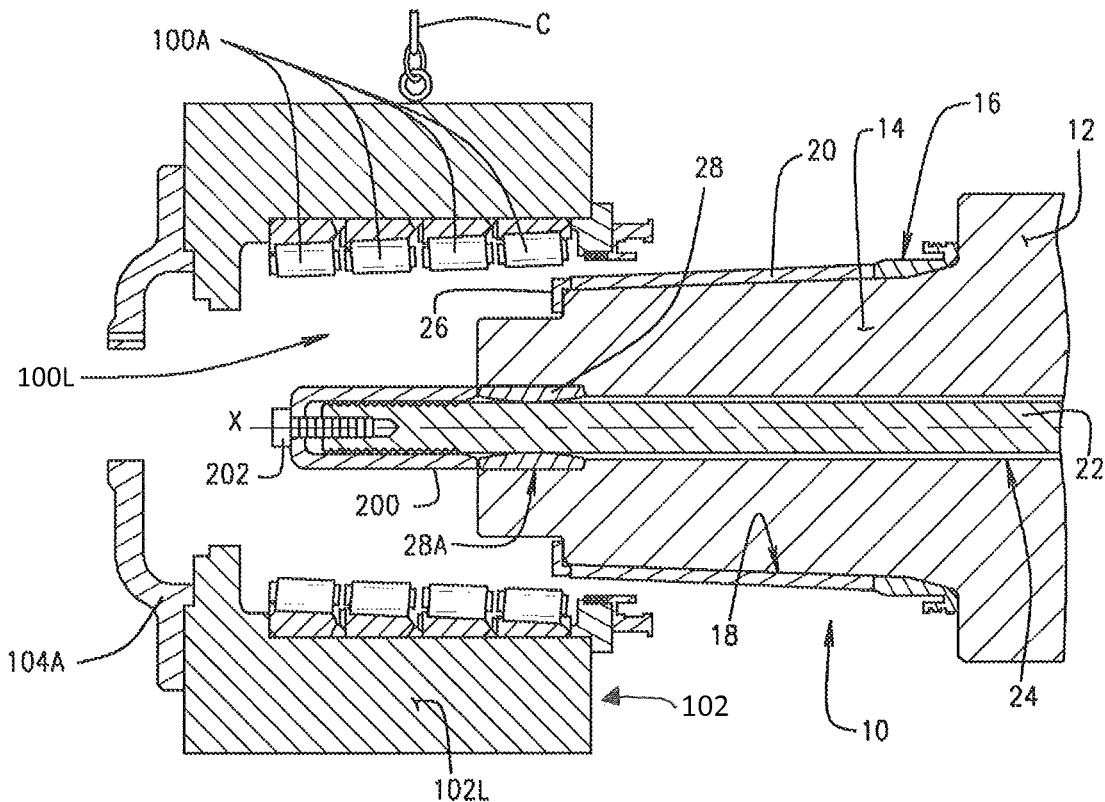
FIG. 5 illustrate the initial step in the installation process for placing the adjustable chock onto a roll end opposite the non-adjustable chock.
Figure 6:
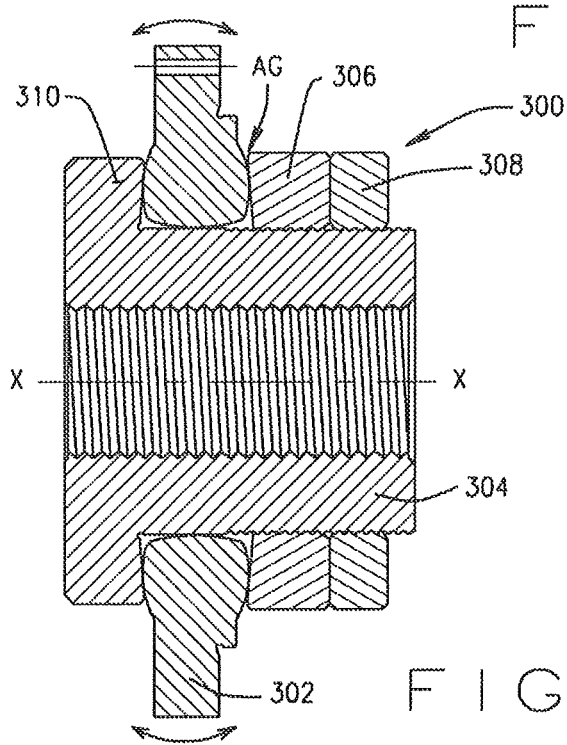
FIG. 6 illustrates a sectional view of a connecting plate sub-assembly for securing the adjustable chock onto the roll end.
Figure 7:
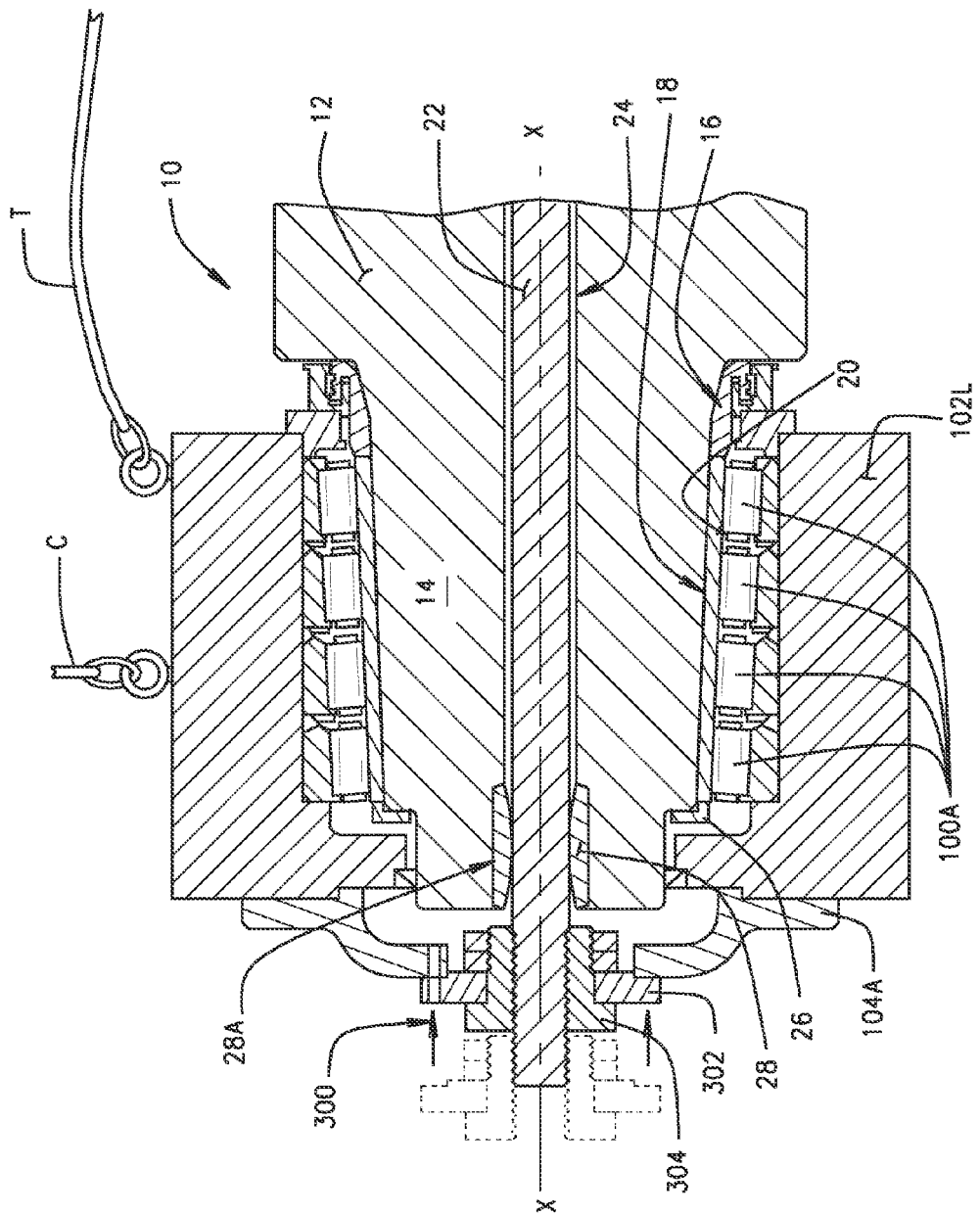
FIG. 7 illustrates the completion of the installation process for placing the adjustable chock onto the roll end with the connecting plate sub-assembly.

Next, as shown in FIGS. 5-7, the adjustable chock 102L is secured to the roll 10 axially opposite from the non-adjustable chock 102R. The adjustable chock 102L includes an end cover 104A rigidly fixed to the outer axial face of the chock 102L. The overhead crane C or lift mechanism can be used (similar to the non-adjustable side) to move the chock 102L and associated bearing assembly 100 into position on the roll neck 14.

Once the bearing assembly 100 and chock 102L have been brought to rest against the tapered sleeve 20 inner rings, a temporary strap T, as shown in FIG. 7, is used to connect the two chock assemblies 102L and 102R together, restraining each from sliding off the respective axial ends of the roll 10. Once this has been accomplished, the temporary restraint 200 on the axial end of the center rod 22 can safely be removed.

To secure the adjustable chock 102L to the axial end of the roll 10 and the center rod 22, a sub-assembly 300 including a connecting plate 302 is employed as shown in FIGS. 6 and 7. The sub-assembly 300 must be assembled before threading a chock adjustment nut 304 onto the threaded end of the center rod 22. A trapping nut 306 and a jam nut 308 secure the connecting plate 302 against a flange 310 on the chock adjustment nut 304. However, a slight axial gap AG is required between the chock adjustment nut 304 and trapping nut 306, so the connecting plate 302 can spin freely about circumference of the chock adjustment nut 304, as required for lining up bolt holes in the connecting plate 302 with corresponding bolt holes in the adjustable chock end cover 104A. Preferably, the inner circumferential surface of the connecting plate 302 is provided with a spherical or curved face, allowing the connecting plate 302 to pivot relative to the axis X-X to accommodate misalignment between the center rod 22 and the adjustable chock end cover 104A.

Figure 8:
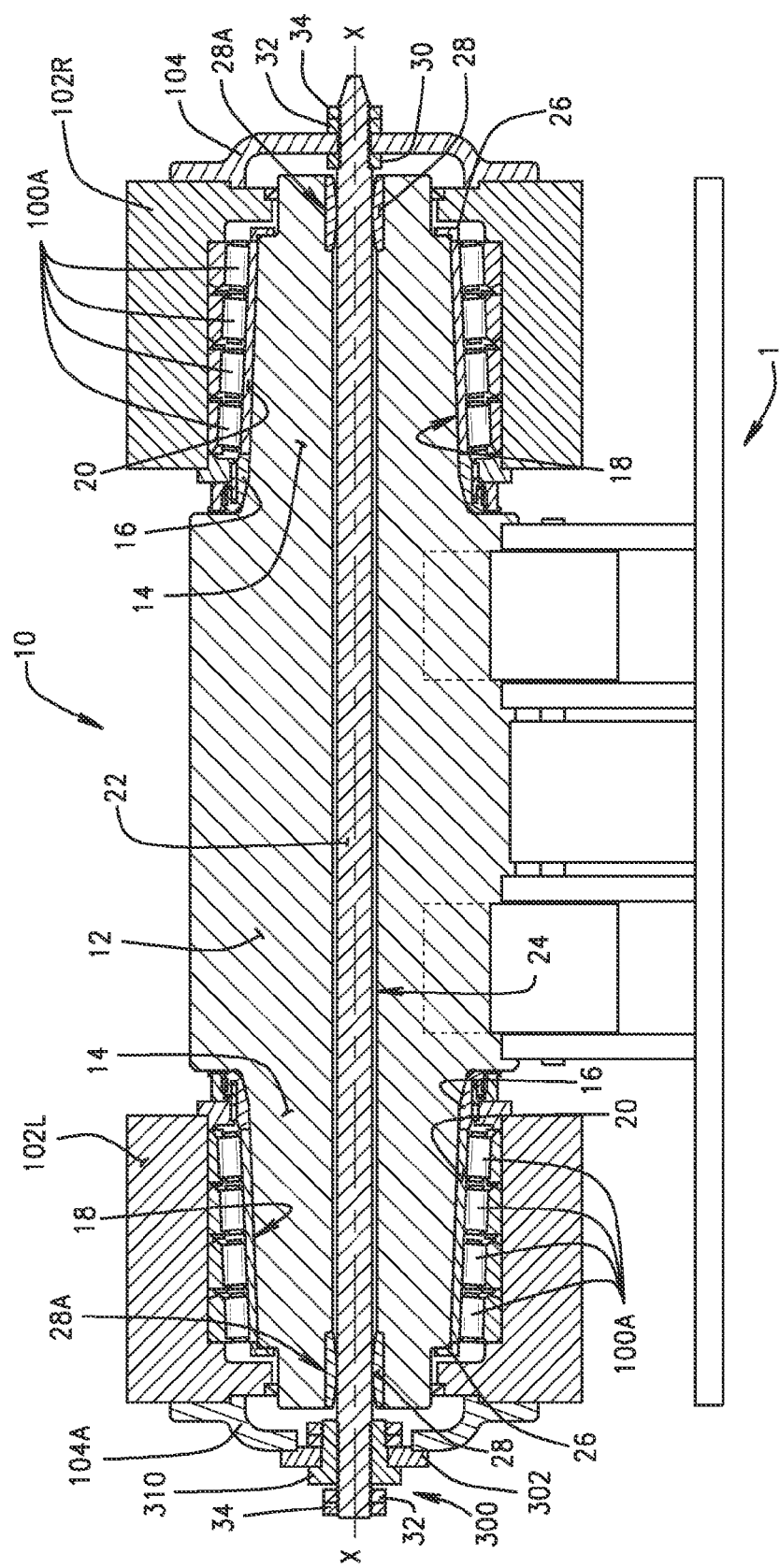
FIG. 8 is a sectional illustration of the roll with the adjustable and non-adjustable chocks installed.

The sub-assembly 300 is threaded onto the end of the center rod 22 as shown in FIG. 7 until the connecting plate 302 makes contact with the adjustable chock's end cover 104A. The connecting plate 302 is then rotated to line up the bolt holes with the end cover 104A, for attachment thereto by suitable bolts (not shown). The combined end cover 104A and sub-assembly 300 is further secured to the center rod 22 by a setting nut 32, with a jam nut 34 additionally applied to the end of the center rod 22 to assure that relative rotation is prevented there between. The chocks 102 are secured after the sub-assembly 300 has been connected to the center rod 22 and the end cover 104A. The setting nut 32 (as shown in FIG. 8), is used to establish an overall bearing clearance, while the jam nut 34 is used to secure the position of the setting nut. At this point, both chocks 104L and 104R are secured on each end of the roll 10, and the temporary strap T can be removed, together with any remaining connections to the supporting crane C or other lift mechanism, as shown in FIG. 8

Figure 10:
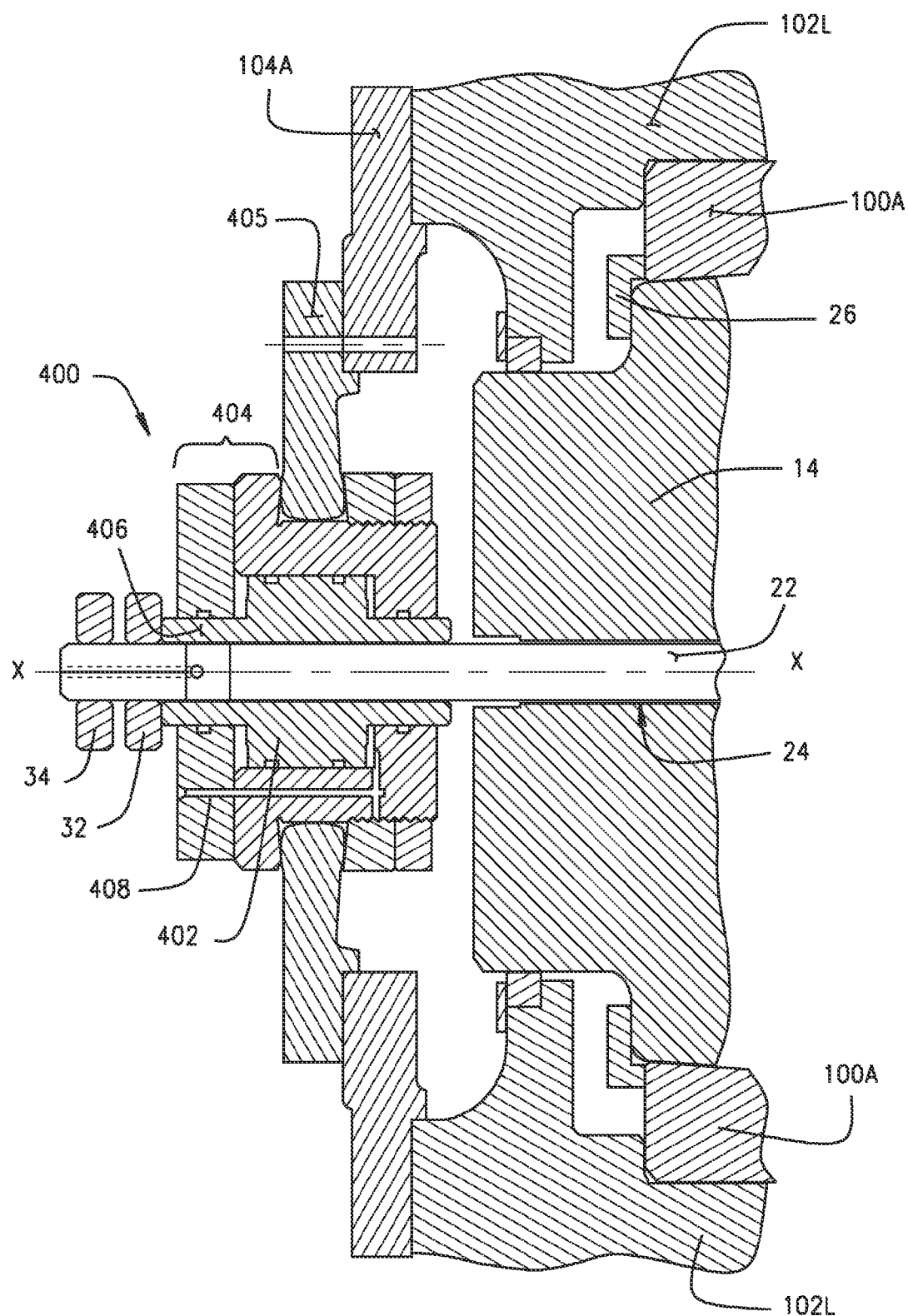
FIG. 10 illustrates a sectional view of an alternate embodiment employing a hydraulic cylinder to effect adjustment to the bearing setting.

In a optional configuration, the sub-assembly 300 at the adjustment end of the roll assembly 10 is replaced with a precision controlled hydraulic cylinder assembly 400, such as shown in FIG. 10, having a hydraulically actuated piston 402 supported within a housing assembly 404. A connecting plate 405 is secured concentrically about the circumference of the housing 404 in much the same manner as is shown in FIG. 6, about the adjusting nut, and is engaged with the end cover 104A of the adjustable end chock 102L, while a coupling means, such as a sleeve 406 abutting the setting nut 32, engages the actuated piston with the axial end of the axial center rod 22. Preferably, the inner circumferential surface of the connecting plate 405 is provided with spherical or curved faces, allowing the connecting plate 405 to pivot relative to the axis X-X to accommodate misalignment between the center rod 22 and the adjustable chock end cover 104A.

In each embodiment, controlled axial position adjustments to the actuated piston 402 of the hydraulic cylinder assembly 404 alter or maintain the bearing settings during the transition from a cold start-up state to a steady-state operating temperature for the rolling mill by exerting forces between the end cover 104A of the adjustable end chock 102L and the axial centering rod 22.

Those of ordinary skill in the art will recognize that a hydraulic cylinder assembly 404 may be utilized to effect adjustment of the bearing setting in a variety of configurations which may differ from that shown in FIG. 10. For example, the hydraulic cylinder assembly 404 may be configured to concentrically surround the axial center rod 22, and to exert an actuating force between the setting nut 32 threaded to an end of the axial center rod 22 and the end cover 104A of the adjustable chock 102L.

Setup for the hydraulic cylinder embodiment shown in FIG. 10 first requires that the hydraulic cylinder assembly 404 be coupled to the adjustable chock 102L in an unpressurized state. Rotation of the roll 10 is begun. Next, during rotation of the roll 10 about the axis X, torque is applied to the setting nut 32 at the end of the axial center rod 22 until a desired preload force is achieved (8500 lbs for example) based on monitoring from associated sensors. Next, shims (not shown) are inserted into the assembly adjacent the setting nut 32, having a thickness selected to correspond to the desired preload force and cold setting values, and the jam nut 34 is tightened onto the axial center rod 22, entrapping the shims (not shown) against the setting nut 32. The shims are then removed without altering the settings of the jam nut 34, and the setting nut 32 is threaded back to the jam nut 34 establishing the cold setting positions. Once the assembled and set mill roll 10 is placed in the mill stand, the hydraulic cylinder assembly 404 is coupled to a controlled source of hydraulic pressure, and the bearing setting can be dynamically controlled as required to maintain the desired settings by introducing or removing hydraulic fluid from hydraulic cylinder assembly 404 through appropriate passages 408, allowing the piston 402 to move within the established tolerance range.

Figure 11:
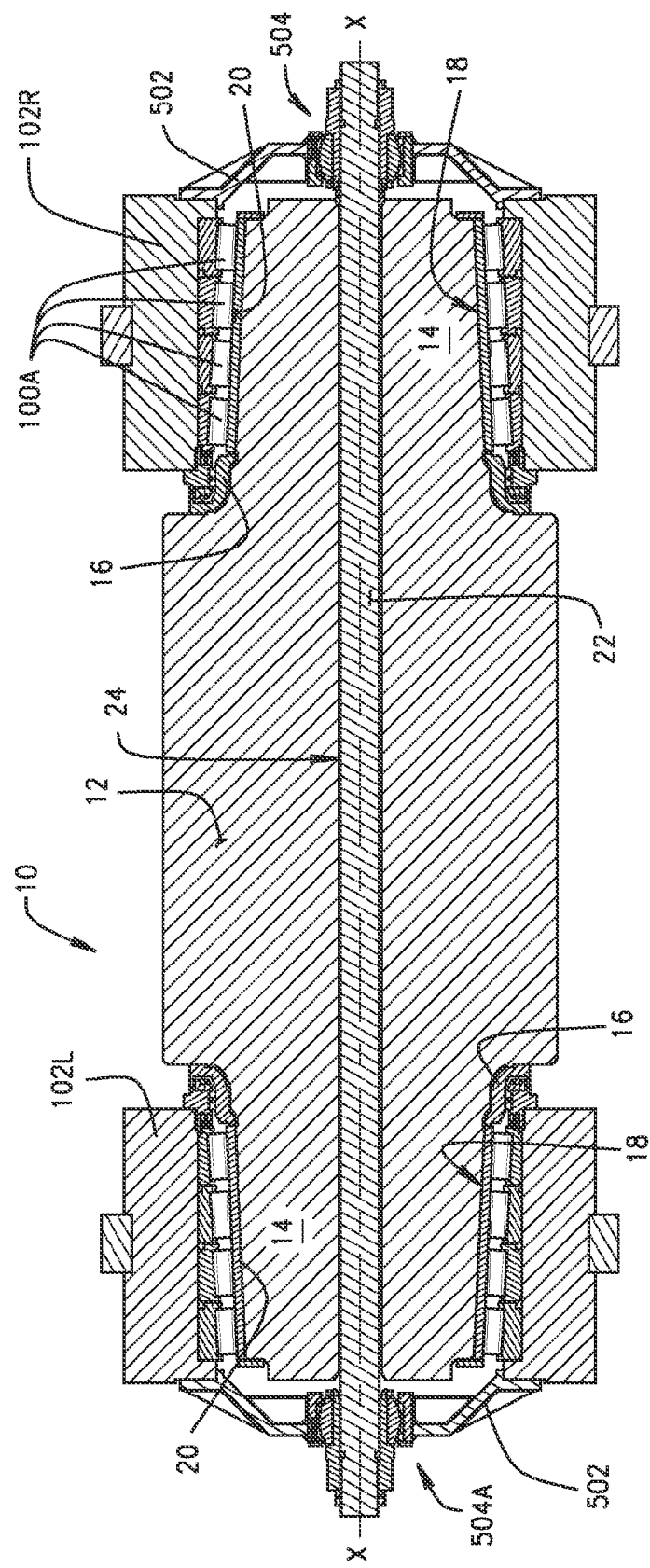
FIG. 11 is a sectional view of an alternate embodiment of the roll system of the present disclosure, with end chocks incorporating plain spherical assemblies.
Figure 12:
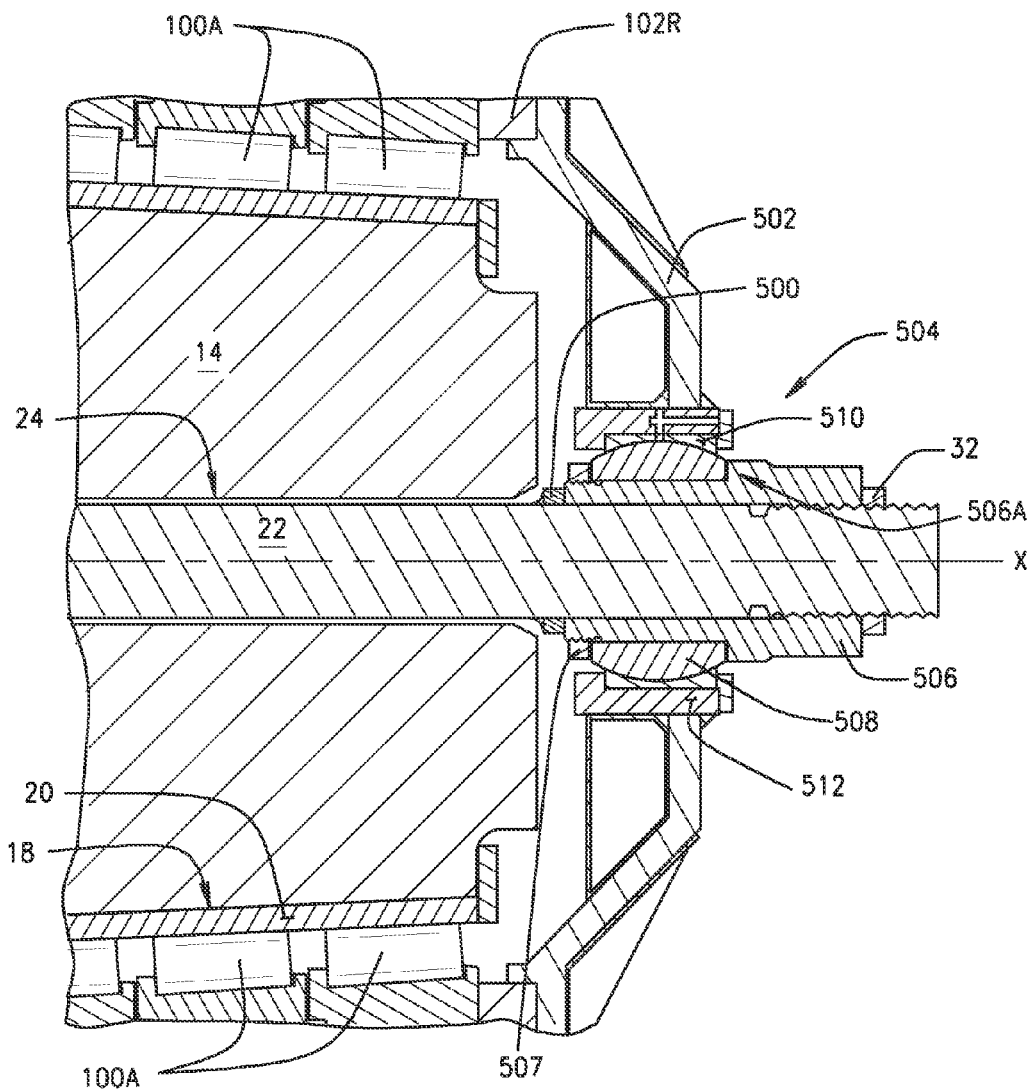
FIG. 12 is an enlarged sectional view of the non-adjustable chock at one end of the roll system of FIG. 11.
Figure 13:
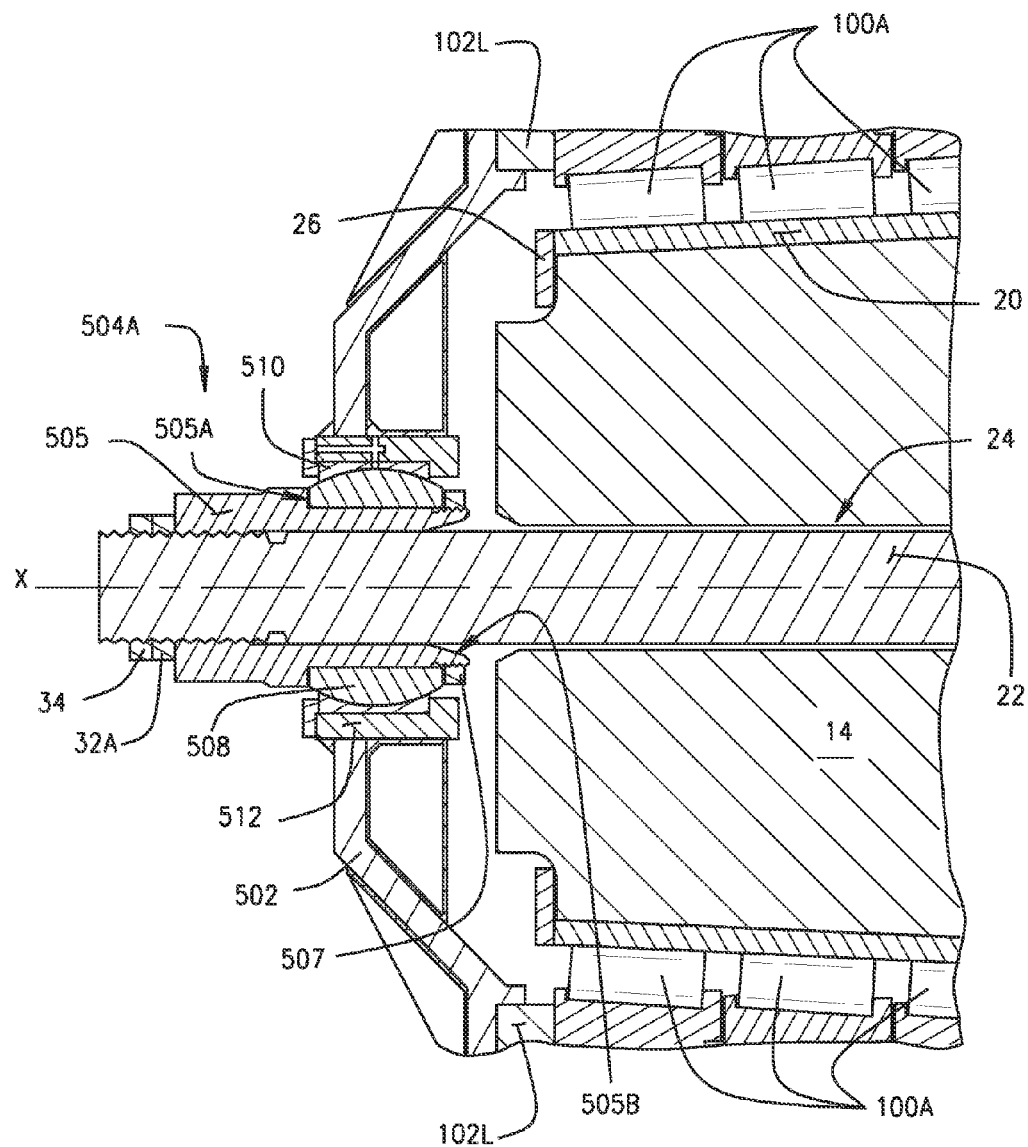
FIG. 13 is an enlarged sectional view of the adjustable chock at a second end of the roll system of FIG. 11.

Turning next to FIGS. 11-13, assembly of an alternate embodiment of the roll 10 is shown. The center rod 22 is initially passed through the roll 10 from the end where the non-adjustable chock 102R will be fitted, to the end of the roll 10 where an adjustable chock 102L is disposed, as is seen in FIG. 11. At one end of the center rod 22, an annular spacer 500 is welded to the center rod 22 axially inward from the threaded end to form a fixed shoulder against which the non-adjustable chock 102R can be secured, as best seen in FIG. 12.

At the non-adjustable or "drive side" chock 102R, a bearing assembly 100 is preassembled into the interior of the chock 102R, and clamped tightly through the bearing cups as described above. An end cover 502 incorporating a plain spherical assembly 504 through which the end of the center rod 22 passes axially, is secured tightly to the outer face of the non-adjustable chock 102R. The plain spherical assembly 504 includes an inner sleeve 506 adapted to fit about the center rod 22, an annular bearing member 508 having a spherical outer diameter surface pre-assembled onto the inner sleeve 506, and a mating outer bearing member 510 having a matching spherical inner diameter surface axially secured to the end cover 502 by a receiving element 512. The bearing engagement between the annular bearing member 508 and the outer bearing member 510 accommodate axial misalignment between the end cover 502 and the center rod 22, while transmitting only pure thrust load there between.

The end cover 502 must be robust in design to absorb the net external thrust that will be absorbed through the center rod 22. In order to absorb any misalignment between the center rod 22 and the chock 102R, the threaded axial end of the center rod 22 is passed through the plain spherical assembly 504 as shown in FIG. 12. The plain spherical assembly's 504 primary function is to reduce the potential for bending loads to be transmitted to the center rod 22 when the chock 102R tilts or rotates under load. Instead, the center rod 22 will be acting under a pure thrust load. It is preferable that the center rod 22 be under a pure thrust load for three reasons: a) bending of the center rod 22 would increase maximum stress, requiring larger rod diameter; b) bending of the center rod 22 would require larger clearance between the rod OD (stationary) and inner diameter of the roll bore 24 during rotation to assure that there is no contact between them during operation of the roll assembly 10; and c) to minimize any tilt restraint of the chocks 102R and 102L under load. The plain spherical assembly 504 will remain "stationary" with no rotation, allowing for the chock 102R to move relative there to, about the axis X.

The entire mounting arrangement (including the end cover 502), is assembled over the end of the center rod 22 as an complete unit that will be clamped to the chock face of the non-adjustable chock 102R. While this is not a necessity, it reduces the number of components to be handled during the assembly process. Specifically, as seen in FIG. 12, the mounting arrangement comprising of the inner sleeve 506 seated about the end of the center rod 22, abutting the fixed shoulder 500. The plain spherical element 508 is carried on the outer diameter of the sleeve 506, and is secured against a shoulder 506A of the sleeve by a jam nut or retainer 507 threaded onto the outer diameter of the sleeve 506. The plain spherical element 508 is, in turn, received within a corresponding spherical bearing surface of the outer bearing member 510 secured within an axial opening of the chock end cover 502. The chock end cover 502 in turn, is seated and secured against the axial face of the chock and bearing assembly mounted about the roll neck 14.

With the center rod 22 end passing through the sleeve 506, a suitable jam or retaining nut 32 is threaded onto the exposed end of the rod, and tightened against the axially outboard end of the sleeve 506, which in turn, is trapped against the fixed shoulder 500 on the center rod 22, thereby securing the entire mounting arrangement of the drive side chock 102R in a fixed arrangement relative to the axial center rod 22. Note, however, at this point, the chock 102R is still not completely secure from sliding down the taper surface of the inner rings 20. The chock 102R is only connected to the center rod 22, which itself is "loose" in the roll 10. To prevent the center rod 22 from pulling through the roll 10, a temporary device 22 may be employed as previously shown in FIGS. 4A and 4B to keep the chock 102R from falling off the end of the roll, when transitioning over to assembly the adjustable chock 102L at the opposite axial end.

At the opposite axial end (adjustable or operator side) of the roll assembly 10, a second bearing assembly is preassembled into the adjustable side chock 102L, and clamped tightly through the cups. A second end cover 502 incorporating a second plain spherical assembly 504A through which the free end of the axial center rod 22 passes, is secured tightly to the outer face of the adjustable chock 102L. As with the non-adjustable chock 102R, the end cover 502 must be robust in design to absorb the net external thrust that will be absorbed through the center rod 22. In order to absorb any misalignment between the center rod 22 and the chock 102L, the free end of the center rod 22 is passed through the plain spherical assembly 504A as shown in FIG. 13. The intention of the plain spherical assembly 504A is to eliminate any potential for bending loads to be transmitted to the center rod 22 if the chock 102L tilts or rotates under load. Instead, the center rod 22 will be acting under pure thrust load. As previously stated, it is preferable that the center rod 22 be under a pure thrust load for three reasons: a) bending of the center rod 22 would increase maximum stress, requiring a larger rod diameter; b) bending of the center rod 22 would require larger clearance between the rod OD (stationary) and inner diameter of the roll bore 24 to assure that there is no contact between them during operation of the roll assembly 10; and c) to minimize any tilt restraint of the chocks 102R and 102L under load. The plain spherical assembly 504A will remain "stationary" with no rotation, allowing for the chock 102L to move relative there to, about the axis X.

The entire mounting arrangement (including the end cover 502), is assembled over the free end of the center rod 22 as a complete unit that will be clamped to the chock face of the bearing assembly 100. While this is not a necessity, it reduces the number of components to be handled during the assembly process. Specifically, as seen in FIG. 13, the mounting arrangement at the adjustment or operator side chock 102L is generally similar to that of the non-adjustable chock 102R, and comprising of a sleeve (Chock Adjusting Device) 505 seated about the end of the center rod 22. The sleeve 505 includes a pilot surface 505B about the axial bore at the inboard end to facilitate assembly of the axial center rod 22 from an "off-center" position. A plain spherical element 508 is carried on the outer diameter of the sleeve 505, and is secured against a shoulder 505A of the sleeve 505 by a jam nut or retainer 507 threaded onto the outer diameter of the sleeve 505. The plain spherical element 508 is received within a corresponding spherical bearing surface of the outer bearing member 510 secured within an axial opening of the chock end cover 502. The chock end cover 502 in turn, is seated against the axial face of the chock 102L and bearing assembly mounted about the roll neck 14.

With the free end of the axial center rod 22 passing through the sleeve 505, a jam or adjustment nut 32 is threaded loosely onto the exposed end of the rod. The sleeve with internal threads is further tightened onto the center rod 22 with appropriate nut torque until a desired preload force is imposed on the adjustable or operator side chock 102L. Those of ordinary skill in the art will recognize that shims may be inserted between the adjustment nut 32 and the axially outboard end of the sleeve 505 to set a suitable clearance. Once the adjustment nut 32 is threaded to the desired position, the shims may be removed and the sleeve backed off from its "preload position" to obtain the desired clearance in both bearing assemblies. A second lock nut 34 is threaded onto the free end of the axial center rod 22, and abutted against the adjustment nut 32 to lock the setting in place and to prevent back-off during operation of the roll assembly 10.

Figure 9:
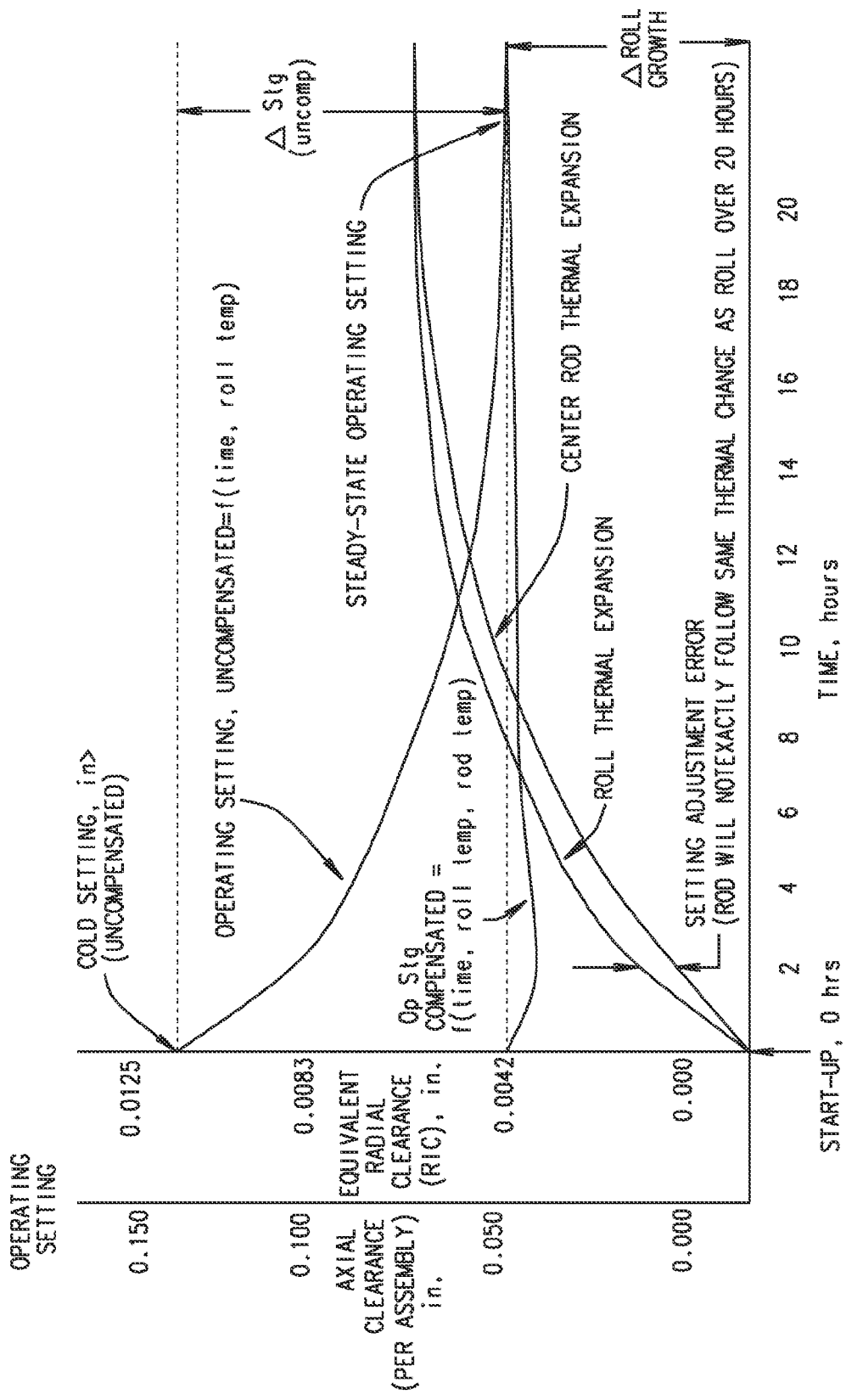
FIG. 9 is a graph of Operating Setting vs. Time for an assembled roll, representing thermal expansion effects and compensation settings.

For each embodiment, once the chocks 102 are secured to the center rod 22 of the roll assembly 10, a cold setting for the bearing assemblies 100 must be established as shown in FIG. 9, before final assembly into a mill stand. A state of preload is needed in order to establish a "reference point" for establishing a "final cold setting". This final cold setting will typically be one of endplay in order to cope with the thermal expansion of the roll 12 that naturally occurs when the roll 12 is operating within the mill environment during the rolling process. As a mill begins to operate, the temperature of the roll 12 will rise, and the bearing's clearance setting will decrease during this transient setting phase. The final operating setting in the mill will be reached when the steady-state temperatures have stabilized. The transition between initial cold setting and final operating setting is denoted in FIG. 9 by the curve labeled "Operating Setting, Uncompensated". Alternatively, if the temperature of the axial center rod 22 can be controlled to compensate for the roll's thermal expansion (denoted by the curve in FIG. 9 labelled "Center Rod Thermal Expansion"), then it is possible to reduce the bearing systems' initial cold setting nearer to it desired operating setting, denoted by the curve in FIG. 9 labeled "Operating Setting, Compensated". The systems and methods disclosed herein enable adjustments to be made to the settings of the bearing assemblies 100 in each chock 102 to accommodate the thermal growth of the roll assembly 10 from the cold start condition to the steady-state temperature, allowing the bearing settings at the steady-state temperature to remain optimal.

There are several methods that could be used to establish the dimensional preload reference point for the roll assembly 10. Each method includes a prior bearing analysis of the link between preload force and dimensional preload, which can be readily obtained through known analysis programs. A typical setting curve is produced as a function of the bearing's geometry.

As an example, to establish a preload dimensional setting of 0.020" preload as the reference point, consider that a preload force required to achieve 0.020" preload is 8500 lbs. It is also known that the nominal nut torque required to achieve 8500 lbs of preload force is 600 ft-lbs. So there are two ways to establish this preload force: Using chock adjustment nut torque (if a strain gage is not used), the roll must be rotated slowly on the set-up stand as the torque is increased on the chock adjustment nut 505 (on the side of the adjustable chock 102L). The torque on the chock adjustment nut 505 is continually increased until finally achieving the 600 ft-lb goal. The roll 12 is then allowed to rotate for a few minutes to assure that the nut torque remains steady. Torque is re-applied if necessary, until the chock adjustment nut 505 no longer moves after applying the 600 ft-lbs of torque to it.

Alternatively, a preferred method is to use a measure of the preload force (if a strain gage is part of the center rod 22 design): The same procedure is used, applying the torque to the chock adjustment nut 505 while the roll 12 is rotating. However, this time the forces are observed from the instrumentation attached to the strain gage associated with the center rod 22. Once 8500 lbs of preload force is achieved, the rotation of the roll 12 is continued for several minutes. The nut torque may have to be reapplied if the measured preload force drops off after the initial 8500 lbs of preload force is first achieved. Once this force reaches a steady-state, the roll 12 can be considered to be in a condition of 0.020" preload, and the reference preload setting has now been established.

With the reference preload setting established, the next step is to establish the cold setting which will achieve the desired operating setting at which the bearings will operate once the mill reaches a steady-state operating condition. Continuing with this example, the cold mounted setting begins at approximately 0.180" per assembly, or 0.015" radial clearance. As the mill starts up and the rolling process begins, the temperature of the roll 12 will grow until it reaches a steady-state temperature. At this point, the mounted setting is measured at as 0.100"—meaning that the thermal growth of the roll 12 is 0.080", since the cold setting began at 0.180". It is important to note that the operating setting must be measured quickly after exiting the mill stand to get an accurate reading of the warm operating setting.

There are two ways in which the cold setting may be established. In a first method of the present invention, the cold setting (initially in endplay) is established with an estimate of how much the thermal expansion of the roll 12 will reduce the setting. The cold setting is conservatively selected to prevent the clearances from being removed completely by the thermal expansion, and to avoid operation in a preload setting. With knowledge of the mill speed, estimates are made of the anticipated thermal changes, from which the initial setting is established. Essentially, the cold setting (initial) is set to be equal to the operating setting (desired) combined with the thermal expansion (estimated) of the roll 12. With this initial setting, adjustments can and should be made by measuring the operating setting (measured) after the roll 12 is removed from the mill. If the operating setting (measured) is within a tolerance of the operating setting (desired), no further changes are required. If the operating setting (measured) exceeds the operating setting (desired), then the cold setting is reduced by an amount equal to the difference between the measured and desired operating settings. Finally, if the operating clearance (measured) is less than the operating clearance (desired), then the cold setting is increased by an amount equal to the difference between the measured and desired operating settings.

In a second method of the present invention, the bearing assembly 100 settings are stabilized through the transition setting phase as the mill roll progresses towards the steady-state operating condition. This permits control of the operating setting to a lower clearance under cold start-up conditions while avoiding a condition of bearing preload after the mill reaches thermal equilibrium during mill operation by providing a means of temperature control for the center rod 22 coupling the opposite chocks 102 and bearing assemblies through the roll 12. The temperature control means may comprise of a heat source applied to the center rod 22 which is controlled to heat the center rod 22 (increasing endplay in the bearings) at the same rate that the roll 12 heats up naturally (decreasing endplay) which occurs during the transition from cold start-up to steady-state operation of the mill. For example the center rod 22 may include a heating element axially disposed within the center rod 22. This allows the cold setting for the bearing assemblies 100 to be adjusted to correspond to the desired operating setting, so long as the thermal compensation is applied to the center rod 22 during the transition, thereby holding a consistent operating setting from cold start-up to the steady-state operation.

Once the roll assembly 10 is installed within the mill housing it will be recognized, that no mill modifications are needed to adapt the present embodiments described herein to an existing mill. Further, for new mills, this same "keeper plate" technology used for latching the operator side chock to the mill that has existed for many years would remain intact for new mills built with this alternate back-up roll arrangement.

In an optional configuration, the use of centering bushings 28 in each end of the roll center bore 24 is eliminated, allowing for additional clearance of the center rod 22 through the roll 12. The center rod 22 will be naturally centered in the roll 12 by the seating of each bearing assembly 100 on each roll end.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for assembling adjustable bearing assemblies onto the axial ends of a mill roll having a roll portion with reduced diameter roll necks at each axial end, and an axial bore, comprising:

disposing an axial center rod within said axial bore of the mill roll, said axial center rod having an axial length greater than the axial length of the mill roll;

disposing tapered sleeves forming an inner ring for the bearing assemblies onto each roll neck of the mill roll;

disposing a first bearing assembly including at least one outer ring and roller assembly within a non-adjustable end chock, said first bearing assembly having an axially open face for receiving the tapered sleeve mounted to a first roll neck of the mill roll, and an end-cover opposite from said axially open face, said end-cover having an axial opening for receiving an axial end of said axial center rod;

positioning said first bearing assembly and said non-adjustable end chock on the first roll neck of the mill roll, such that said bearing assembly is in contact with an outer diameter surface of said tapered sleeve, and an axial end of said axial center rod passing through said axial opening in said end-cover;

securing said first bearing assembly and said non-adjustable end chock to said axial end of said axial center rod;

disposing a second and adjustable bearing assembly including at least one second outer ring and second roller assembly within an adjustable end chock, said second bearing assembly having an axially open face for receiving a second tapered sleeve mounted to a second roll neck of the mill roll, and an end-cover opposite from said axially open face, said end-cover having an enlarged axial opening for receiving a free axial end of said axial center rod;

positioning said second bearing assembly and said adjustable end chock on the second roll neck of the mill roll, such that said bearing assembly is in contact with an outer diameter surface of said second tapered sleeve, and said free axial end of said axial center rod passing through said enlarged axial opening in said end-cover;

securing said second bearing assembly and said adjustable end chock to the free axial end of said axial center rod; and establishing a bearing setting for said first and second bearing assemblies between said end chocks through said axial center rod.

2. The method of claim 1 wherein said step of establishing a bearing setting for said first and second bearing assemblies includes establishing a cold setting in an end-play state for each of said bearings to allow for thermal expansion.

3. The method of claim 1 wherein said step of establishing a bearing setting for said first and second bearing assemblies includes monitoring forces on said axial center rod.

4. The method of claim 1 wherein thermal expansion of said axial center rod is controlled to maintain an established bearing setting during a transition from a cold start state to a steady-state operating temperature for said mill roll.

5. The method of claim 1 further including the steps of:
assembling an connecting plate sub-assembly;
engaging said connecting plate sub-assembly with said free axial end of said axial center rod passing though said enlarged axial opening in said end-cover of said adjustable end chock, whereby said connecting plate sub-assembly engages said end-cover;

wherein said step of securing said second bearing assembly and said adjustable end chock to the free axial end of said axial center rod includes securing said connecting plate sub-assembly to said end-cover; and wherein said step of establishing said bearing setting includes adjusting said engagement between said connecting plate sub-assembly and said axial center rod.

6. The method of claim 5 wherein said connecting plate sub-assembly consists of a chock adjustment nut, a connecting plate concentrically disposed about the chock adjusting nut, and at least one trapping nut securing the connecting plate against a circumferential flange on the chock adjustment nut; and wherein said step of securing said connecting plate sub-assembly to said end-cover of said adjustable end chock includes coupling said connecting plate to said end-cover.

7. The method of claim 6 wherein said connecting plate pivots relative to an axis of said chock adjusting nut to accommodate axial misalignment between said axial center rod and said end-cover of said adjustable end chock.

8. The method of claim 7 wherein said connecting plate pivots on a spherical inner diameter surface.

9. The method of claim 8 wherein said connecting plate engages said circumferential flange and said at least one trapping nut with spherical surfaces.

10. The method of claim 5 wherein said connecting plate sub-assembly consists of a precision controlled hydraulic cylinder assembly 400 having a hydraulically actuated piston 402 supported within a housing 404, a connecting plate 405 coupled concentrically to the housing 404, and a coupler 406 for securing the piston to the axial end of the center rod; and wherein said step of securing said connecting plate sub-assembly to said end-cover 104A of said adjustable end chock 102L includes coupling said connecting plate to said end-cover.

11. The method of claim 10 wherein said connecting plate 405 pivots relative to an axis of said hydraulic cylinder assembly 404 to accommodate axial misalignment between said axial center rod 22 and said end-cover 104A of said adjustable end chock 102L.

12. The method of claim 11 wherein said connecting plate 405 pivots on a spherical inner diameter surface.

13. The method of claim 5 wherein said connecting plate sub-assembly comprises a precision controlled hydraulic cylinder assembly having a hydraulically actuated piston supported within a housing, a connecting plate coupled concentrically to the housing and a coupler for securing the piston to the axial end of the center rod, wherein said step of securing said connecting plate sub-assembly to said end-cover of said adjustable end chock includes coupling said connecting plate to said end-cover.

14. The method of claim 13 wherein said connecting plate pivots relative to an axis of said hydraulic cylinder assembly to accommodate axial misalignment between said axial center rod and said end-cover of said adjustable end chock.

15. The method of claim 14 wherein said connecting plate has a spherical inner diameter surface on which it pivots relative to the axial center rod.

16. The method of claim 1 wherein said first bearing assembly 100 and said non-adjustable end chock 102R are secured to said axial end of said axial center rod 22 via a plain spherical assembly 504 secured to said axial end of said axial center rod 22;

wherein said second bearing assembly 100 and said adjustable end chock 102L are secured to said free axial end of said axial center rod 22 via a plain spherical assembly 504A secured to said free axial end of said axial center rod 22; and wherein said step of establishing a bearing setting for said first and second bearing assemblies 100 is performed by adjusting an axial position of said second plain spherical assembly 504A relative to said axial center rod 22.

17. The method of claim 16 wherein said plain spherical assembly 504 for securing said first bearing assembly 100 and said non-adjustable end chock 102R to said axial end of said axial center rod 22 consists of a sleeve member 506 fitted about said axial end of said axial center rod, said sleeve member abutting a fixed shoulder 500 on said axial center rod and retained thereon by a setting nut 32, a plain spherical element 508 fitted about an outer surface of the sleeve member, between a retaining shoulder 506A and a second jam nut 507 threaded to the outer surface of the sleeve member, and a spherical bearing surface secured within an axial opening of the chock end cover 502.

18. The method of claim 16 wherein said plain spherical assembly 504A for securing said second bearing assembly 100 and said adjustable end chock 102L to said free axial end of said axial center rod 22 consists of a sleeve member 505 fitted about said axial end of said axial center rod 22, said sleeve member 505 having a pilot surface 505B for guiding placement onto said free end of said axial center rod 22, a plain spherical element 508 fitted about an outer surface of the sleeve member, between a retaining shoulder 505A and a second jam nut 507 threaded to the outer surface of the sleeve member, and a spherical bearing surface secured within an axial opening of the chock end cover 502; and wherein said sleeve member 505 is retained on said free axial end of said axial center rod by an adjustment nut 32 threaded onto said free axial end of said axial center rod to control an endplay setting.

19. The method of claim 1 wherein said first bearing assembly and said non-adjustable end chock are secured to said axial end of said axial center rod by a plain spherical assembly secured to said axial end of said axial center rod, said second bearing assembly and said adjustable end chock are secured to said free axial end of said axial center rod by a plain spherical assembly secured to said free axial end of said axial center rod, and the step of establishing a bearing setting for said first and second bearing assemblies comprises adjusting an axial position of said second plain spherical assembly relative to said axial center rod.

20. The method of claim 19 wherein said plain spherical assembly for securing said first bearing assembly and said non-adjustable end chock to said axial end of said axial center rod comprises a sleeve member fitted about said axial end of said axial center rod, abutting a fixed shoulder on said axial center rod and retained thereon by a setting nut, a plain spherical element fitted about an outer surface of the sleeve member between a retaining shoulder and a second jam nut threaded to the outer surface of the sleeve member, and a spherical bearing surface secured within an axial opening of the chock end cover.

21. The method of claim 19 wherein said plain spherical assembly for securing said second bearing assembly and said adjustable end chock to said free axial end of said axial center rod comprises of a sleeve member fitted about said axial end of said axial center rod and having a pilot surface guiding placement onto said free end of said axial center rod, a plain spherical element fitted about an outer surface of the sleeve member between a retaining shoulder and a second jam nut threaded to the outer surface of the sleeve member, and a spherical bearing surface secured within an axial opening of the chock end cover; said sleeve member being retained on said free axial end of said axial center rod by an adjustment nut threaded onto said free axial end of said axial center rod to control an endplay setting.

22. An adjustable bearing arrangement for a mill roll having an axial center bore extended through a roll and a neck portion at each axial end of the mill roll, comprising:
- a first tapered bearing assembly mounted to a first neck portion at a first axial end of the mill roll and including an end chock;
- a second tapered bearing assembly mounted to a second neck portion at an opposite axial end of the mill roll and also including an end chock;
- a center rod coupling said first bearing assembly to said second bearing assembly through said axial center bore; and,
- means for adjusting a bearing setting for a clearance sufficient to accommodate thermal expansion of the roll during operations and misalignment between an end chock and the center rod.

23. The adjustable bearing arrangement of claim 22 wherein each bearing assembly includes an inner ring fitted to an associated neck portion of the mill roll, an outer ring coupled to the center rod, and a set of rolling elements disposed between the inner ring and the outer ring.

24. The adjustable bearing arrangement of claim 23 wherein each bearing assembly 100 is coupled to said center rod 22 via a plain spherical assembly 508 configured to accommodate misalignment between the center rod and the bearing assembly.

25. The adjustable bearing arrangement of claim 22 further including a setting adjustment assembly coupled to the center rod, said setting adjustment assembly configured to selectively alter the setting of said first and second bearing assemblies simultaneously.

26. The adjustable bearing arrangement of claim 25 wherein said setting adjustment assembly 32, 300, 400 includes a hydraulically actuated cylinder 402 in engagement with said center rod 22 for altering a force on said center rod.

* * * * *